United States Patent [19]

Dever, Jr.

[11] 4,144,295
[45] Mar. 13, 1979

[54] GENERATION OF POLYURETHANE FOAM

[75] Inventor: Gerald V. Dever, Jr., Trumbull, Conn.

[73] Assignee: Olin Corporation, New Haven, Conn.

[21] Appl. No.: 873,303

[22] Filed: Jan. 30, 1978

Related U.S. Application Data

[62] Division of Ser. No. 762,555, Jan. 25, 1977.

[51] Int. Cl.² .............................................. B29D 27/04
[52] U.S. Cl. .................................. 264/40.2; 264/46.5; 264/51
[58] Field of Search ..................... 264/40.1, 40.2, 40.5, 264/40.7, 51, 54, 333, 46.5

[56] References Cited

U.S. PATENT DOCUMENTS

| | | | |
|---|---|---|---|
| 3,081,487 | 3/1963 | Heffner et al. | 264/54 X |
| 3,247,295 | 4/1966 | Burwell | 264/40.5 X |
| 3,409,044 | 11/1968 | Sobek et al. | 239/335 X |
| 3,541,023 | 11/1970 | Cole | 252/359 |
| 3,624,885 | 12/1971 | Holliday et al. | 425/145 X |
| 3,674,399 | 7/1972 | Sendor | 425/257 X |
| 3,677,681 | 7/1972 | Zippel et al. | 264/40.1 X |
| 3,833,693 | 9/1974 | Ross | 264/333 X |
| 4,051,209 | 9/1977 | Tabler | 264/40.7 X |
| 4,075,301 | 2/1978 | Oswald | 264/40.7 |

Primary Examiner—Philip Anderson
Attorney, Agent, or Firm—Bruce E. Burdick; Donald F. Clements; Thomas P. O'Day

[57] ABSTRACT

An improvement in the generation of foam from a mixture of foam-forming material in a structure having a preferred configuration. Conveying means are used to convey the structure along a horizontal path. A plurality of foam gun heads are mounted in spaced relationship to each other over and transverse to said horizontal path. Each foam gun head includes a foam dispensing outlet and valve means for controlling the discharges of the foam-forming materials therefrom. First, sensing means are provided upstream of the foam dispensing outlets for sensing the passage of the structure thereby. A plurality of second sensing means are positioned upstream of the foam dispensing outlets in spaced relationship to each other in a direction transverse to the horizontal path, each one of the second sensing means being associated with one foam gun head for sensing the presence of the structure in a vertical direction. The valve means in a foam gun head is opened in response to the first sensing means sensing the structure and its associated second sensing means also sensing the structure. The valve means of a given foam gun head is closed in response to its associated second sensing means detecting the absence of structure.

2 Claims, 4 Drawing Figures

GENERATION OF POLYURETHANE FOAM

This is a division of application Ser. No. 762,555 filed Jan. 25, 1977.

BACKGROUND OF THE INVENTION

This invention relates to improvements in the generation of polyurethane foam. More particularly, the present invention relates to improvements in the generation of polyurethane foam wherein a multi-foam gun head dispensing system is used to generate foam in a structure having a preformed configuration.

The present invention has particular application to the generation and dispensing of polyurethane foam into relatively large surface areas. For example, polyurethane foam may be used to provide insulation between building panels. Such panels may be used in the construction of relatively large buildings and comprise a shell of concrete or other building material having a core of polyurethane foam therein for insulating purposes. Such core may be considered a foam "slab". The foam slab may be generated by dispensing the foam-forming materials directly into one-half of the building panel or into a mold.

In dispensing polyurethane foam into such large surface areas, one previously known method has been to utilize a single foam dispensing gun head and allow the foam to flow to cover the area. However, the foam begins to rise into its full free-rise volume immediately upon being dispensed from the foam gun head. Thus, there has been problems with obtaining foam slabs having a uniform density throughout. In addition, the overall average density of such foam slab is higher which affects its overall economics.

In considering an automatic system for dispensing foam generating material, problems arise due to the fact that the width and/or length of two different foam slab configurations may vary by design. In addition, in some instances it is desirable to have openings in the foam slab to provide windows or doors in the ultimate panel. This adds to the problems of providing an efficient automated system.

SUMMARY OF THE INVENTION

The present invention has as its object, the overcoming of the problems discussed above.

In accordance with the present invention, there is provided a novel technique for dispensing polyurethane foam into panels or molds whereby the foam is evenly distributed over the surface area.

In addition, according to the present invention, the foam dispensing technique of the present invention takes into consideration variations in the width and/or length between two different molds or panels.

Further, the present invention also takes into consideration that a given panel or mold may have an opening therein wherein no foam-forming material is desired.

These and other objects and advantages of the present invention may be achieved, according to the preferred embodiment of the present invention, through the provision of an apparatus having conveying means for conveying the structure into which the foam-forming materials are to be dispensed along a horizontal path. A plurality of foam gun heads are mounted in spaced relationship to each other and transversely to said horizontal path. Each foam gun head may include a foam dispensing outlet and valve means for controlling the discharge of the foam forming material therefrom. First sensing means are provided upstream of the foam dispensing outlets for sensing the passage of the structure thereby. A plurality of second sensing means are positioned upstream of the foam dispensing outlets in spaced relationship to one another in a direction transverse to said horizontal path, one of said second sensing means being associated with each foam gun head for sensing the presence of said structure in a vertical direction. Means are provided for opening the valve means of each foam gun head in response to the first sensing means sensing the structure and an associated second sensing means also sensing said structure, and for closing the valve means of a given foam gun head in response to its associated second sensing means detecting the absence of structure.

In accordance with the preferred method of the present invention, the structure into which the foam-forming materials are to be dispersed is conveyed along a horizontal path underneath a plurality of foam gun heads having outlets spaced transversely of said path. The presence of the structure is sensed at a point upstream of the foam gun head, outlets by a first sensing means. The presence of the structure is sensed in a vertical direction at a point upstream of the foam gun head outlets by a plurality of second sensing means which are spaced from each other in a direction transverse to said horizontal path, one of said second sensing means to being associated with one of said foam gun heads. The valve means of a given foam gun head is opened in response to the first sensing means sensing the presence of structure and its associated second sensing, sensing the presence of structure. The valve means of a given foam gun head is closed in response to its associated second sensing means sensing the absence of structure.

In accordance with another aspect of the invention, an apparatus is provided for controlled placement of a mixture of foam-forming materials, into a preformed structure. The apparatus includes a conveying means for conveying the structure along a horizontal path; a plurality of foam gun heads mounted in spaced relationship to each other over and transversely to said path, each said foam gun head including a foam dispensing outlet and valve means for controlling the discharge of the foam-forming materials therefrom; means for opening the valve means of an individual foam gun head when said structure passes under the outlet thereof; and means for closing the valve means of an individual foam gun head during the period of time, no structure passes under the outlet thereof.

DETAILED DESCRIPTION

Figure 1:
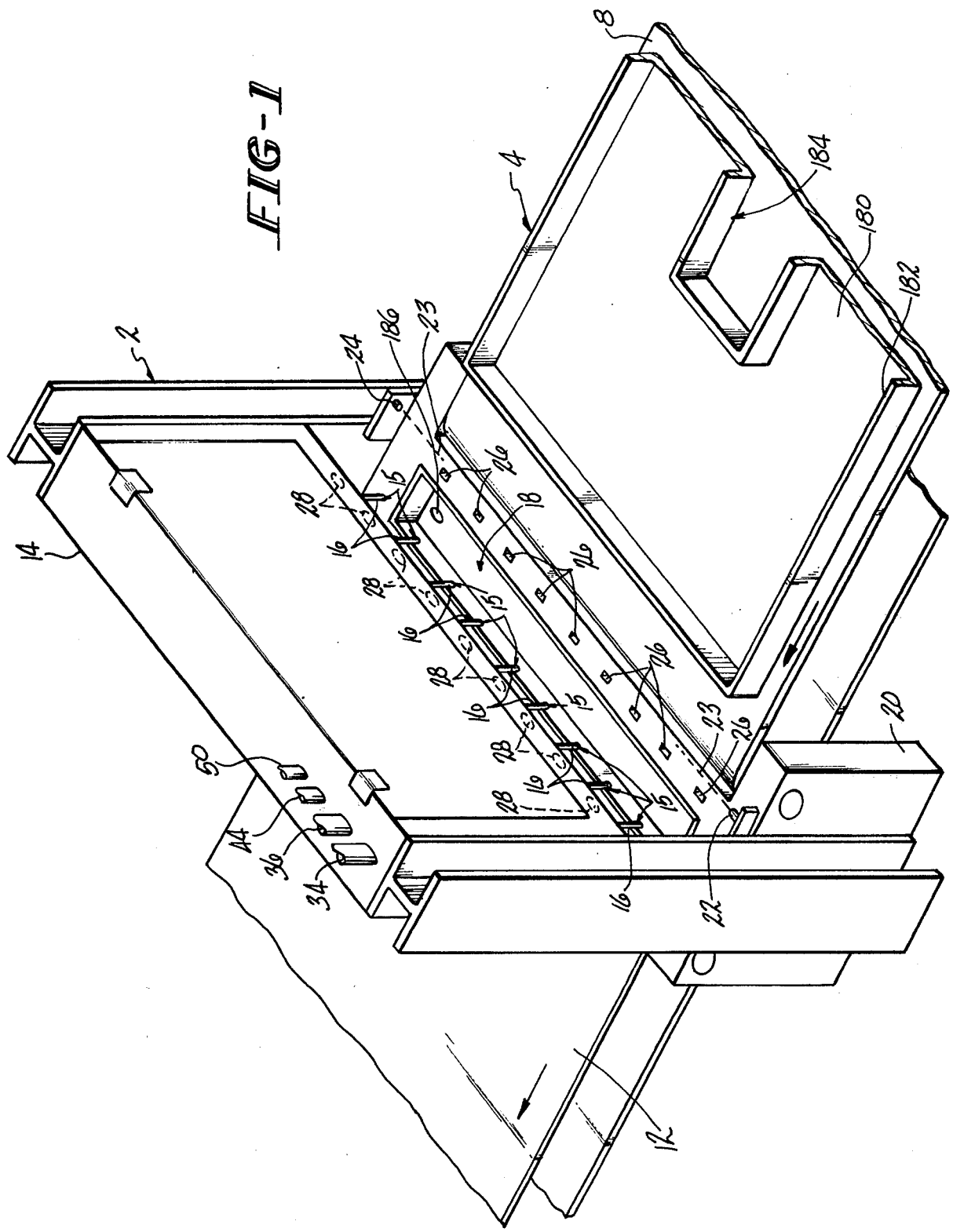
FIG. 1 is a perspective view showing the general arrangement of the apparatus of the present invention.

Referring to the drawings, and in particular to FIG. 1, there is shown an apparatus used to practice the present invention. The apparatus, according to the present invention, generally includes a tower 2 from which foam is dispensed into a structure such as a panel or mold 4 passing therethrough. The panel of mold 4 is transported by a continuous conveyor 8 to the tower 2 and removed therefrom by a second continuous conveyor 12.

The tower 2 includes an upper cabinet 14 which houses a plurality of foam dispensing gun heads 15 having nozzles 16 which extend in a vertical direction from the underside of the cabinet 14. The foam gun heads 15 are spaced apart from each other in a direction transverse of the direction of movement of the panel or mold 4 as shown in FIG. 1. Any number of foam gun heads may be used depending upon the width of the widest panel or mold to be used. Directly underneath the nozzles 16 of the foam gun heads 15 is a trough 18 which is moveable between lower position wherein its upper surface is substantially flush with a bottom cabinet 20 and a raised position wherein the nozzles 16 extend thereinto.

The tower 2 also includes a horizontally directed photocell 22 having a light source 24 which supplies a light beam 23 extending horizontally, across the path of travel of the mold of panel 4. Downstream of the horizontally directed photocell 22, but slightly upstream of the nozzles 16, are a series of vertically directed photocells 26, one associated with each of the foam gun heads 15 and positioned in the bottom cabinet 20. The upper cabinet 14 is provided with a corresponding light source 28 for each of the vertically directed photocells 26 which directs a vertical light beam 27 from the bottom of the upper cabinet 14 to its corresponding photocell 26 positioned in the lower cabinet 20.

Figure 2:
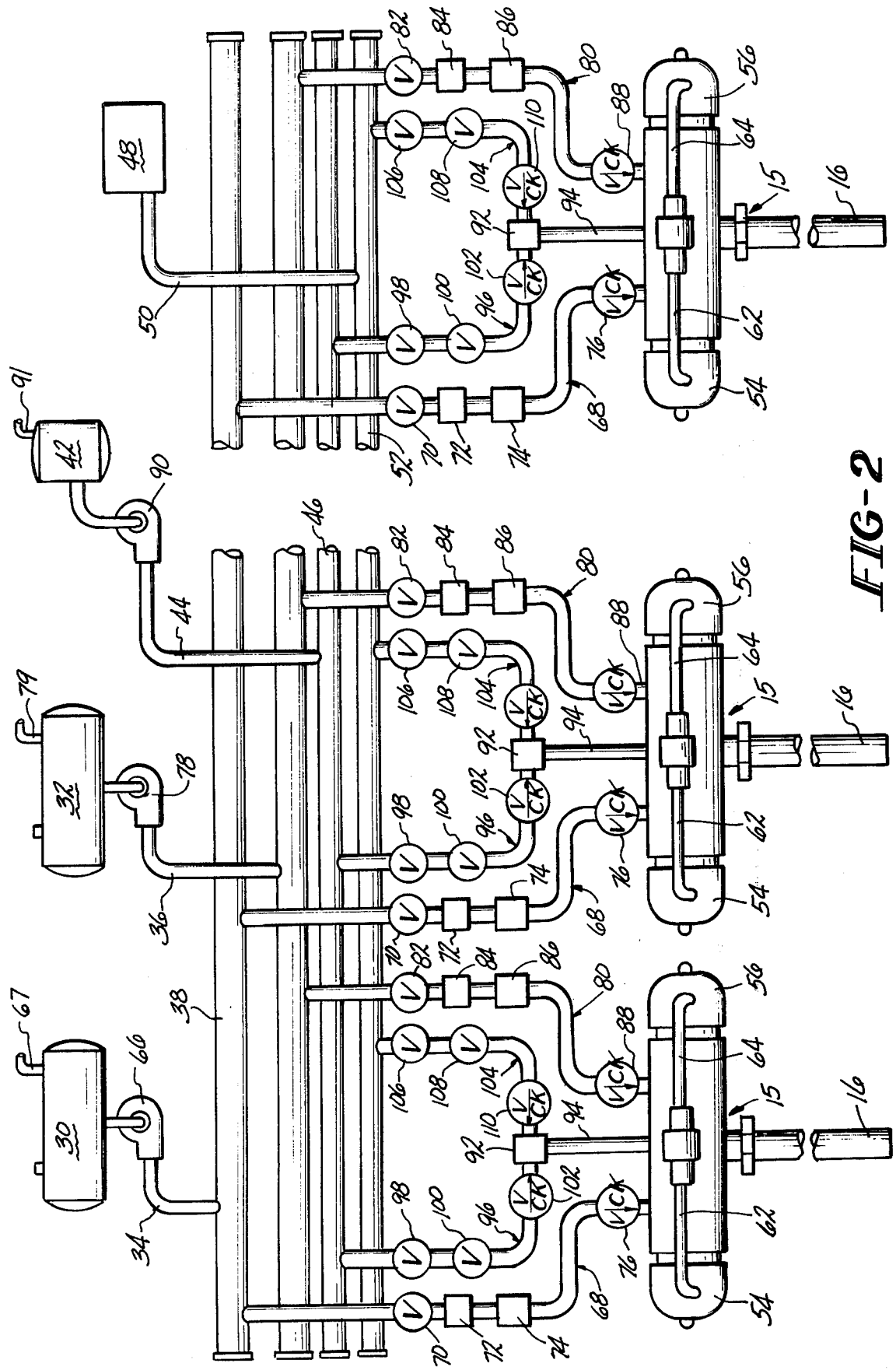
FIG. 2 is a schematic illustration showing the details of various material flow paths of the apparatus of FIG. 1.

Referring now to FIG. 2, the apparatus includes a first storage tank 30 which houses a first reactant material and a second storage tank 32 which houses a second reactant material. The storage tanks 30 and 32 may be located remote from the tower 2. Each of the reactants contained within its respective storage tanks 30 or 32 is pumped through a suitable delivery line 34 or 36, respectively, to its respective manifold 38 or 40 located within the upper cabinet 14 for distribution to each of the foam gun heads 15.

The apparatus also includes a solvent storage tank 42 to provide a supply of solvent through a delivery line 44 to a manifold 46 located within the upper cabinet 14 for distribution to each of the foam gun heads 15 for the cleansing thereof. A supply of purge gas such as compressed air may be supplied to the foam gun heads 15 from a compressor 48 through a suitable conduit 50 into a manifold 52 also located within the upper cabinet 14 for purging each of the foam gun heads 15.

More in detail, the present invention in its preferred form is useful in the generation and dispensing of two reactive ingredients commonly used to produce polyurethane foam. In general, polyurethane foam may be produced by the reaction of a polyol with an organic polyisocyanate in the presence of a reaction catalyst and a foaming agent. Any known foam-forming formulation may be generated by, and dispensed from the apparatus of the present invention. The polyol reactant may be any material having at least two active hydrogens as determined by the Zerewitinoff method, such as described, for example, in U.S. Pat. No. 3,167,528, issued Jan. 26, 1965 to Kaiser et al. Similarly, any organic isocyanate containing at least two NCO groups may be utilized in preparing the foam. Illustrative polyisocyanates include toluene diisocyanates and the polymeric isocyanates such as disclosed in U.S. Pat. No. 2,683,730, issued July 13, 1954 to Seeger et al. The foaming agent may be any one of those known in the art to be useful for such purpose such as water, an organic foaming agent, or a mixture of at least two foaming agents. Illustrative organic foaming agents are disclosed in U.S. Pat. No. 3,072,582, issued Jan. 8, 1963 to Frost. Any catalyst or mixture of catalysts known to be useful in making polyurethane foam may be employed such as disclosed for example, in U.S. Pat. No. 3,397,158 issued to Britain et al, on Aug. 13, 1968.

In utilizing the apparatus of the present invention, a first reactant material comprising the organic polyisocyanate or a polyisocyanate polyol pre-polymer may be stored in one of the reactant storage tanks, for example, the first storage tank 30. In the other reactant storage tank, the second storage tank 32, the polyol may be stored. Conveniently, a reaction catalyst may also be included in this tank. The foaming agent may be supplied from a third storage tank or, as is preferred, the foaming agent may be included in at least one and preferably both of the storage tanks 30 and 32.

A suitable solvent for the reactant materials is stored in the solvent storage tank 42. Such solvent may be methylene chloride, 1,1,1-trichlorethane, or any other solvent suitable for the purpose.

The foam gun heads 15 are preferably of the type described in U.S. Pat. No. 3,409,044, issued to Sobek et al on Nov. 5, 1968, the entire disclosure of which is incorporated herein by reference. Each foam gun head 15, as shown in that patent, includes two valved passageways leading to a mixing chamber which communicates with the outlet of the nozzle 16. If desired, the interior of each nozzle 16 may be provided with a static mixer and form part of the mixing chamber. One suitable static mixer is described in U.S. Pat. No. 3,286,992, issued to Armeniades et al on Nov. 22, 1966, the entire disclosure of which is incorporated herein by reference. A suitable foam gun head having a static mixer is shown and described in U.S. Patent Application Ser. No. 656,157, filed Feb. 9, 1976, in the name of J. F. Zwirlein, the entire disclosure of which is incorporated herein by reference.

Each foam gun head 15 includes two valve actuators 54 and 56 to open and close the valves in the valved passageways leading to the mixing chamber. The valve actuators 54 and 56 are operated simultaneously by means of a double acting air cylinder 58 (see FIG. 3) having a piston and piston rod 60 therein with the piston rod 60 connected to connecting links 62 and 64.

The first reactant material is supplied, at a predetermined constant pressure maintained by any suitable means such as a pump 66 or a constant pressure gas supply 67, from its storage tank 30 to its manifold 38. One passageway of each of the foam gun heads 15 is connected to the first reactant manifold 38 by a suitable connecting line 68. The connecting line 68 may be provided with a manually actuated on-off valve 70 which may be used for repair and maintenance purposes. A filter element 72 may also be included in line 68 to remove any foreign, solid particles which may be present in the reactant material flowing to the foam gun head 15. It is also preferred to interpose in line 68 a flow control unit 74 in order to regulate the flow of the reactant material. Any suitable type of flow controller may be used such as the device described in U.S. Pat. No. 3,541,023 issued to Cole on Nov. 17, 1970. A one-way check valve 76 may also be provided in line 68 adjacent to the entrance to the passageway in the foam gun head 15.

The second reactant material is supplied, at a constant pressure maintained by any suitable means such as a pump 78 on a constant pressure gas supply 79, from its storage tank 32 through its delivery line 36 to its manifold 40. The other passaageway of each foam gun head 15 is connected to the second reactant manifold 40 by a suitable connecting line 80. In a like manner to the connecting line 68, the connecting line 80 may include a manually actuated on-off valve 82, a filter element 84, a flow control unit 86, and a one-way check valve 88. The use of the flow control units 74 and 86 in each of the lines 68 and 80 respectively, enables the reactant materials to be supplied to the foam gun head 15 in a predetermined ratio. Flow control units of the type detailed in FIGS. 3 and 4 of the above-mentioned Cole patent incorporate means to enable the adjustment of the flow therethrough to any desired constant rate. With such an arrangement, the relative proportions of the reactants flowing to the foam gun head through lines 68 and 80 can be varied depending upon their respective compositions and/or viscosities.

The solvent is forced, at a constant pressure maintained by any suitable means such as a pump 90 or a constant pressure gas supply 91, from its storage tank 42 to its manifold 46 through its connecting line 44. Each foam gun head 15 has a central inlet communicating with the mixing chamber such as shown in the above-mentioned U.S. Patent application Ser. No. 656,157. This inlet is connected to the outlet of a connector 92 having two inlets by a suitable connecting line 94. One inlet of each of the connectors 92 is connected to the solvent manifold 46 through a connecting line 96. Each connecting line 96 includes a manually operated shut-off valve 98 for repair and maintenance purposes, and a pneumatically operated ball valve 100 which is the on-off valve used to control the flow of solvent to the foam gun head 15 during operation. A one-way check valve 102 may also be provided in line 96 adjacent the connector 92.

The supply of pressurized fluid is supplied to its manifold 52 through its delivery line 50. The pressurized fluid may be compressed air or any other gas suitable for purging the foam gun head. If the gas is compressed air, the air may be supplied by a separate compressor 48 or any other available source of compressed air.

The other outlet of each connector 92 associated with each foam gun head 15 is connected to the purge gas manifold 52 by a suitable connecting line 104. Each connecting line 104 includes a manually operated shut-off valve 106 for repair and maintenance purposes, and an electrically operated on-off solenoid valve 108 which is the on-off control valve for the purge gas. A check valve 110 may be provided in line 104 adjacent the connector 92.

Figure 3:
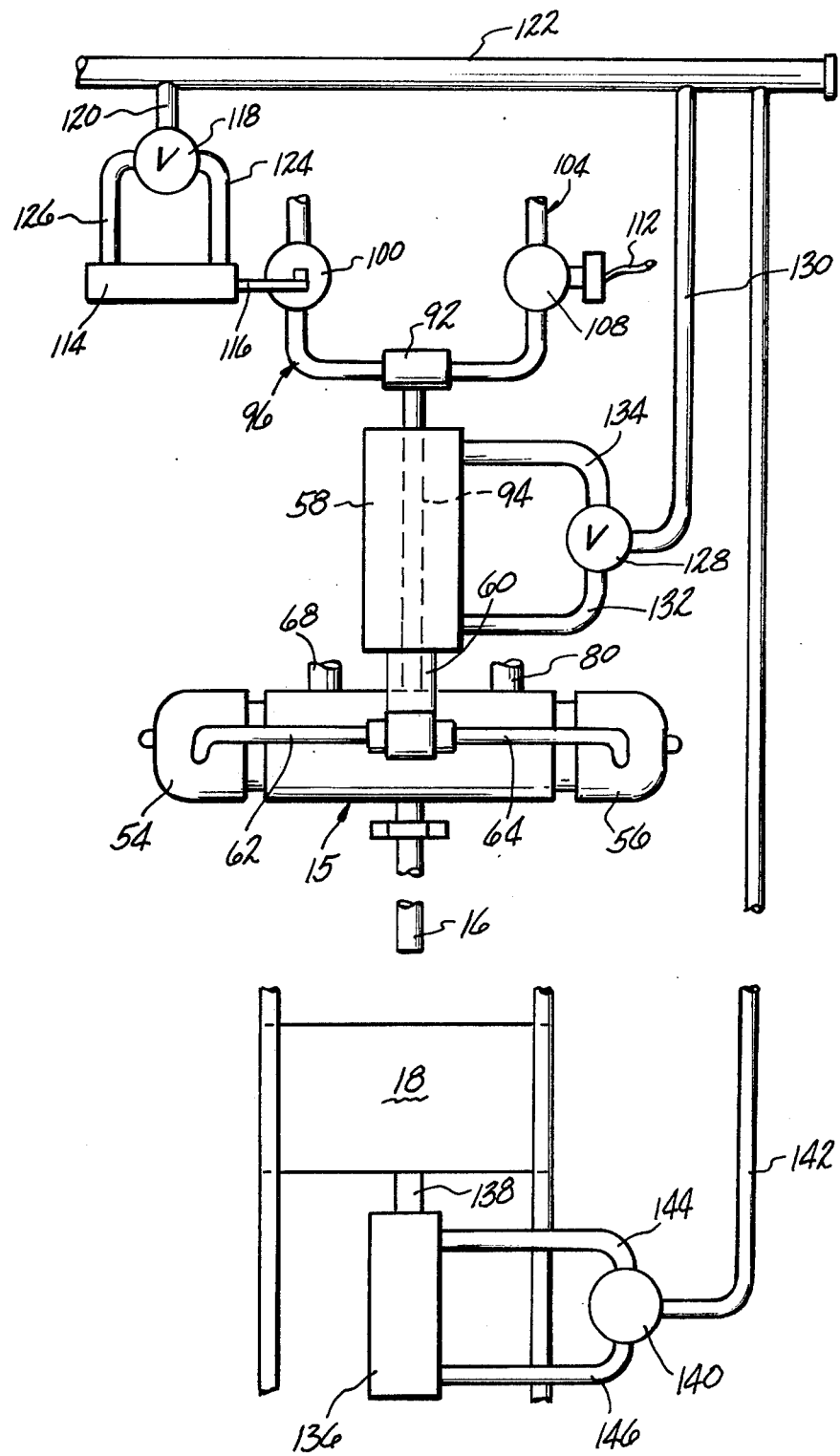
FIG. 3 is a schematic illustration showing the details of the various actuators of the apparatus of FIG. 1.

Referring now to FIG. 3, the various valve operators are shown schematically. The valve 108 in each purge gas line 104 is a solenoid valve and has its electrical connector 112 directly connected to the electrical circuit of FIG. 4.

The ball valve 100 in each solvent connecting line 96 is pheumatically operated by means of a double acting air cylinder 114. The air cylinder 114 includes a piston and piston rod 116 mechanically connected to the valve 100 so that when the piston rod 116 is moved to one position the valve 100 is opened and when returned to its original position, the valve 100 is closed. The air cylinder 114 is in turn controlled by a two-way electrically operated solenoid valve 118 provided in the line 120 supplying the operating fluid to the air cylinder 114. The solenoid valve 118 is electrically connected to the electrical circuit of FIG. 4.

For the purpose of supply operating fluid to the various air cylinders of the apparatus, a manifold 122 may be provided in the upper cabinet 14 to which the various air cylinders may be connected. The manifold 122 may be connected to any suitable supply of operating fluid such as compressed air.

The solenoid valve 118 associated with air cylinder 114 serves to direct the operating fluid to one side of the piston or the other. When the solenoid is not energized, the valve 118 is in one position so that the operating fluid is directed through passage 124 to move the piston and piston rod 116 into the position wherein the ball valve 100 is closed. When the solenoid is electrically actuated, the valve 120 closes off passage 124 and directs air through passage 126 to the other side of the piston to move the piston and piston rod 116 into a position wherein the ball valve 100 is opened.

The valve actuators 54 and 56 used to actuate the valves in each of the foam gun heads 15 to dispense the reactants into the mixing chamber and out of the nozzle 16 are operated by the double acting air cylinder 58. The piston rod 60 of the air cylinder 58 is connected to connecting links 62 and 64 which in turn are connected to the actuators 54 and 56, respectively. The arrangement is such that when the piston rod 60 is moved downwardly from its position as shown in FIG. 3, the valve actuators 54 and 56 are rotated about an axis extending perpendicular to the axis of the piston rod 60 and the valves in the passageways in the foam gun head 15 open and permit the flow of the reactants from lines 68 and 80 to enter the mixing chamber in the foam gun head 15 and be dispensed from the nozzle 16 thereof. When the piston rod 60 is returned to its original position, the valves in the passageways in the foam gun head are closed.

The operation of the air cylinder 58 is controlled by a two-way electrically operated solenoid valve 128 provided in the line 130 supplying the operating fluid to the air cylinder 58. The line 130 is connected to the operating fluid manifold 122. The solenoid valve 128 serves to direct the operating fluid to one side of the piston or the other. When the solenoid is not energized, the valve 128 is in one position to direct the operating fluid through passage 132 to move the piston and piston rod 60 into an upper position (as viewed in FIG. 3) and close the valves in the foam gun head 15. When the solenoid is electrically actuated, the valve 128 closes off passage 132 and directs air through passage 134 to the other side of the piston and moves the piston and piston rod 66 into a lower position (as viewed in FIG. 3) to open the valves in the foam gun head 15. The solenoid valve 128 is electrically connected to the electrical circuit shown in FIG. 4.

The trough 18 is mounted in the lower cabinet for movement between a lower position substantially flush with the top of the bottom cabinet 20 and a raised position wherein the nozzles 16 of each foam gun head 15 extend thereinto. The trough 18 is moved by an air cylinder 136 having a moveable piston and piston rod 138 therein. The free end of the piston rod 138 is connected to the trough 18 so that the trough 18 will rise when the piston rod 138 is moved upwardly (as viewed in FIG. 3) and will lower when the piston rod 138 moves downwardly.

The operation of the air cylinder 136 is controlled by an elctrically operated two-way solenoid valve 140 provided in the line 142 supplying the operating fluid to the air cylinder 138. The line 142 may be connected to manifold 122 or any other soruce of pressurized operating fluid. The solenoid valve 140 serves to direct the operating fluid to one side of the piston or the other. The solenoid valve 140 is connected to the electrical circuit of FIG. 4. When the solenoid of the valve 140 is not energized, the valve 140 directs the operating fluid through passage 144 to move the piston and piston rod 138 into its lower position, lowering the trough 18 into its lower position. When the solenoid of valve 140 is energized, the valve 140 closes off passageway 144 and directs the operating fluid through passageway 146 to move the piston and piston rod 138 upwardly and thereby raise the trough 18 into its raised position. Although only one air cylinder 136 is shown in FIG. 3 for raising the lowering the trough 18, additional air cylinders, operated as explained above, may be utilized, if desired.

Figure 4:
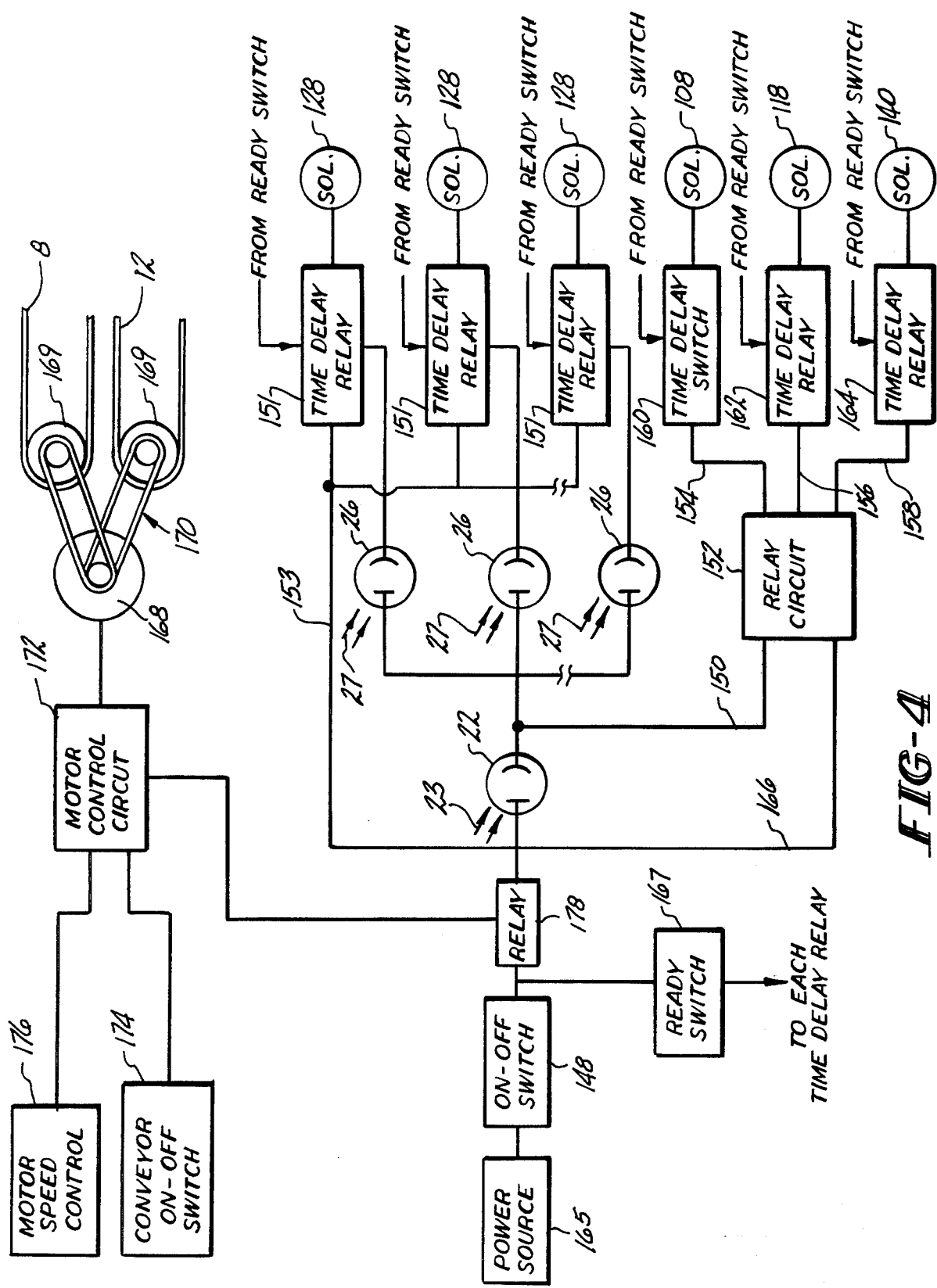
FIG. 4 is a schematic illustration of an electrical circuit which may be used in the apparatus of FIG. 1.

FIG. 4 is a schematic illustration of the electrical connection of the various actuators of the apparatus of the present invention. The electrical circuit includes a master on-off switch 148 which is of the manual type. The switch 148 is used to energize and de-energize the electrical circuit when the switch is turned on or off respectively. The horizontally directed photocell 22 is in series with the switch 148 and each of the vertically directed photocells 26. All of the photocells 22 and 26 are of any type which, when actuated by a light beam from their associated light source, open the electrical circuit and when the light beam is broken, close the electrical circuit.

Each of the photocells 26 are electrically connected to a time delay relay 151 which when actuated, closes after a predetermined period of time to supply current from conductor 153 to its associated solenoid of the solenoid valve 128 which is used to control the air flow to the double acting air cylinder used to operate the valve actuators 54 and 56 of the foam gun head 15.

The photocell 22 is also electrically connected in series by an electrical connector 150 to a relay circuit 152 which has three outputs 154, 156 and 158. Output 154 is connected through a time delay relay 160 to the solenoid of each solenoid valve 108 which is used to control the flow of compressed air to the foam gun heads 15. Output 156 is connected through a time delay relay 162 to the solenoid of each of the solenoid valves 118 which is used to control the flow of the pneumatic fluid to the air cylinder 114 used to actuate the ball valve 100 to control the flow of the solvent to the foam gun heads 15. The output 158 is connected through a time delay relay 164 to the solenoid of the solenoid valve 140 used to control the flow of the pneumatic fluid to the double acting air cylinder 136 used for raising and lowering the trough.

The relay circuit 152 is connected to a suitable power source 165 through the on-off switch 148 by electrical connector 166. The relay circuit 152 serves to connect the power souce 165 through conductor 166 to the outputs 154, 156 and 158 when actuated by the photocell 22 through conductor 150. A "ready" switch 167 is also provided which, when actuated, resets all relays 150, 160, 162 and 164 to an active position before a new sequence can start.

A conveyor drive circuit is also shown in FIG. 4 for driving the conveyor 8 and 12. A variable speed electric motor 168 may be used to drive the conveyor 8 and 12. For this purpose, the output shaft of the motor 168 is connected to a drive roller 169 associated with each conveyor 8 and 12 by a suitable mechanical drive train arrangement such as a sproket and gear arrangement 170. A motor control circuit 172 is provided to control the motor 168 along with manually-actuated on-off switch 174 to start the conveyor in motion. A manually adjustable speed control 176 is connected to the motor control circuit 172 so that the conveyor speed may be varied by manual adjustment.

A relay 178 may be provided in the circuit leading to the solenoids 128 and 108, 118, 140 such as shown in FIG. 3 which is normally open, but which is closed when the conveyor drive is operating. This prevents opening of the valves of the foam gun heads 15, the opening of solvent valve 100, the air purge valve 108 and the raising of the trough 18, unless the conveyors 8 and 12 are in motion.

Relay circuit 152 is normally open when photocell 22 is contacted by the light beam 23 from source 24 and current is flowing through conductor 150. When the light beam 23 to photocell 22 is broken and current flows through conductor 150, relay circuit 152 is still open but is set for actuation. After light beam 23 is restored and the circuit through conductor 150 reopened, whereby no current flows through conductor 150 the relay circuit 152 will close, permitting current to flow from conductor 166, through the circuit 152 to the outputs 154, 156 and 158 and the time delay relays 160, 162 and 164 respectively. The time delay relays 160, 162 and 164 are of the type which are normally open, but close after a predetermined period of time after actuation to permit current to pass through the relay circuit 152 to the solenoids of valves 108, 118 and 140 for a predetermined period of time whereupon the relays 160, 162 and 164 open again.

In operation, with the master on-off switch 2 on so that the circuit is closed, and with the "ready" switch 167 having been actuated to reset the relays 128, 160, 162 and 164 the photocells 22 are actuated by the beam of light from source 24 so that no current passes from power source 165 to time delays 151. When light beam 23 is broken by the passage of the mold or panel 4 to be filled, the circuit through the photocell 22 is closed, providing current to photocells 26 and the relay circuit 151. The photocells 26, receiving a beam of light, are normally open until the beam of light is interrupted. When the beam of light to a given photocell 26 is broken, the circuit is closed and current will pass to its associated relay 151, which after a predetermined time delay, will close. Upon closing of a relay 151, a current will pass from conductor 153 through the relay 151 to its associated solenoid valve 128 causing actuation of the valve 128 and operation of its associated foam gun head. The valve 128 will remain actuated as long as the beam to its respective photocell 26 is broken. When the beam to a given photocell 26 is again restored, no current passes from the photocell 26 to the relay 151, and the relay will open after a predetermined time period, causing deactuation if valve 128 and closing of the valves in its associated foam gun head.

Upon breaking of the light beam to photocell 22 by the passage of the mold or panel thereby, the circuit is also closed to the relay circuit 152 through conductor 150. This readies the relay circuit 152 for later actuation. When the panel or mold 4 completely passes by the photocell 22 and the photocell 22 again senses a light beam from its light source, which results in closing of the valves in the form gun heads 15, the circuit through conductor 150 is opened. Upon opening of this circuit, the relay circuit 152 closes to permit the passage of current from conductor 166 through the circuit 152 to outputs 154, 156 and 158, actuating the time delay relays 160, 162 and 164. The time delay relay 164 is set to close after a slight time delay, whereupon the solenoid of solenoid valve 140 is actuated causing the solenoid valve 140 to admit pneumatic fluid to the air cylinder 136 to raise the trough 18 to its upper position.

The time delay relay 162 is set to close after the passage of a suitable time period to allow the trough 18 to raise. After passage of such time period, the time delay relay 162 closes, activating the solenoid of each solenoid valve 118 to open valve 100 in the solvent lines 96 to permit solvent to flow to each gun heads 15 for cleaning purposes. After a predetermined time period, the time delay relay 162 closes, the solenoid of the solvent valve 118 is de-energized, and the valve 100 in the solvent line is closed.

The time delay relay 160 is set to close at about the same time as the time delay relay 162 re-opens. There may be a slight overlapping in time between the time the air purge is commenced and the solvent flow is shut off. Upon closing of the time delay relay 160, the circuit to the solenoid of solenoid valve 108 is closed and the solenoid valve 108 in the air purge line is opened for a predetermined short period of time. After such period of time, the time delay relay 160 opens whereupon the air purge solenoid valve 108 is closed.

The time delay relay 164, controlling the acutation of the trough 18, is set to remain closed, thereby maintaining the trough in its raised position, until the air purge valve 108 has been closed by opening of the time delay relay 160. After this predetermined period of time, the time delay relay 164 will close, whereupon the solenoid valve 140 will switch and admit fluid to the air cylinder 136 to cause the trough 18 to return to its lower position.

To begin a new sequence of operation, the ready switch 167 must be activated to set the various time delay relays. Thereafter, the passage of a panel or mold 4 past the photocells 22 and 26 will cause the operation of the foam gun heads 15 and, after the foam gun heads 15 have been deactivated, the sequence of raising the trough, activating and deactivating the solvent flow, activating and deactivating the air purge and lowering of the trough 18 as explained above.

As mentioned above, the present invention may be used for making foam slabs useful as an insulating core in structural panels. Various techniques may be used in fabricating such insulated panels. In one instance, one half of the building panel may be used as a mold into which the foam is dispensed. Immediately after the panel is filled with foam, and before the free-rise volume of the foam has been obtained, the other half of the panel may be placed on top of the bottom panel which contains the foam, and the two panels held together under pressure until the foam cures, providing a completed building panel. Alternatively, the foam may be dispensed into the bottom panel and the foam allowed to rise to its full free-rise volume after which the top panel may be fitted over the bottom and connected thereto, compressing the foam therebetween, and providing a final assembly. Yet another alternative is to utilize a mold to preform the foam slab. In such a case, the foam is dispensed into the mold, and either allowed to free rise, or immediately contained by a top mold, and the "slab" resulting therefrom after curing can then be used as the core in a later operation when the actual building panels are assembled.

Referring again to FIG. 1, the structure 4 into which the foam-forming mixture is dispensed, whether it be one-half of a structural panel or a mold, includes a bottom 180 and side walls 182. If it is necessary to provide an opening in the resulting foam slab for a window or door, the bottom of the structure is cut away and side walls are provided surrounding the opening as indicated at 184 in FIG. 1.

The operation of the apparatus in dispensing the foam-forming ingredients into a structure 4 such as shown in FIG. 1 is as follows. The on-off switch 148 of the apparatus is turned on the the "ready" switch 167 is activated to set the various relays in the electrical circuit. The motor speed control 176 may then be set to obtain the proper conveyor speed. It is to be noted that the rate of flow of the reactant materials from each nozzle 16 of a foam gun head 15 is maintained constant. Therefore, the thickness of the foam is dependent upon the rate of speed at which the structure 4 passes under the nozzles 16. The slower the structure moves, the thicker the foam will be in the structure and visa versa. As the conveyors 8 and 12 control the speed of movement of the structure along its horizontal path under the nozzles 16, the thickness of the foam may be controlled by adjusting the speed of the conveyors.

After the conveyor switch 174 has been turned on, the structure 4 will move on the conveyor 8 toward the tower 2. The light beam from light source 26 will extend across the path of travel of the structure 4 to the photocell 22. The light beams from all light sources 28 will extend vertically toward their associated photocells 26.

When the front end of the structure 4 passes by photocell 22 and breaks the light beam, the electrical circuit is put into a "go" condition as explained above. When the bottom 180 of the structure breaks one of the light beams to one of the vertically extending photocells 26, its associated foam-gun head 15 discharges the foam-forming mixture from its nozzle 16 into the structure 4. It is to be noted that 4. It those foam gun heads whose associated light beams are broken are activated. Thus, if a relatively narrow structure 4 is being used which does not extend all the way across the horizontal path, one or more outer foam gun heads whose light beam is not broken by the bottom of the structure 4, will not be activated. Thus, the apparatus can automatically adjust the width of the dispension of the foam-forming materials to take into account the width of the mold of panel into which the materials are being dispensed.

When an opening in the structure, such as opening 184 in FIG. 1, passes over one or more photocells 26, the light beam to such photocell is restored which serves to stop the flow of material from its associated foam gun head. Thus, no foam will be dispensed into the opening where it is not needed. After the opening 184 has passed by the photocell 26, the bottom of the structure will again break the light beam and that particular foam gun head will again be actuated.

Each foam gun head 15 will continue to dispense foam as long as the horizontal light beam to photocell 22 is broken and the vertical light beam to its associated photocell 26 is broken. When the horizontal light beam to photocell 22 is restored, after passage of the structure thereby, the foam gun heads 15 will be turned off after a predetermined time period sufficient to permit the end of the structure to reach the nozzles. Thus, by virtue of the arrangement of this invention, any length of structure may be used with the present apparatus.

After a predetermined time interval passes after the end of the structure 4 passes the photocell 22 and the light beam is restored thereto, the trough 18 is raised into its upper position surrounding the nozzles 16. Thereafter, the solent valve 100 to each foam gun head 15 is opened for a predetermined time period and all the foam gun heads 15 are flushed with solvent to cleanse them to remove any residual foam-forming materials. The raising of the trough 18 to its upper position prevents excessive splattering of solvent and residual foam-forming materials which could result in injury to person or property, or contamination. The trough 18 may be provided with a drain 186 which may be connected to a suitable container for collecting the solvent.

After the solvent flush has terminated, the air purge valves 108 to each foam gun head 15 are opened to provide a gas blast through each foam gun 15 to complete the cleansing. In some instances, it may be desirable to start the air purge slightly before the solvent flush has finished.

After the air purge, the trough 18 is returned to its lower position. The apparatus is then ready to receive another structure 4 after the "ready" switch 167 is activated, whereupon, the above sequences are repeated. However, no adjustments will have to be made to the apparatus if the new structure 4 is of a different width or length than the preceeding structure, or if an opening 184 is provided in different locations. The apparatus of the present invention automatically controls the operation of the foam gun heads 15 in a manner that only those foam gun heads 15 which are needed are utilized to dispense the foam-forming ingredients.

While reference has been made above to a preferred embodiment of the present invention, it will be apparent to those skilled in the art that various modifications and alterations may be made thereto without departing from spirit of the present invention. Therefore it is intended that the scope of this invention be ascertained by reference to the following claims.

What is claimed is:

1. A method of generating foam from a mixture of foam-forming materials in a structure having a preformed configuration, said foam-forming materials being dispensed from a plurality of stationary foam gun heads having valve means therein for controlling the discharge of the foam-forming materials therefrom, said method comprising:
   (a) conveying said structure along a horizontal path underneath said stationary foam gun heads with said foam gun heads having outlets being spaced transversely across said path;
   (b) vertically sensing the presence of at least a portion of said structure at any one of a plurality of points upstream of said foam gun head outlets by a respective one of a plurality of vertical sensing means spaced from each other in a direction transverse to said horizontal path, each of said sensing means being associated with a respective one of said plurality foam gun heads;
   (c) opening the valve means of said one foam gun head in response to its associated sensing means sensing the presence of said portion of the structure;
   (d) closing said opened valve means when its associated sensing means is not sensing the presence of said structure; and
   (e) reopening said closed valve means when its associated sensing means again senses presence of a portion of said structure, thereby automatically compensating for narrow width or openings of said structure.

2. The method of claim 1 wherein: the valve means are fully opened during the opening step and maintained fully open until the closing step, and the speed at which the structure is conveyed during said conveying step is varied so as to achieve a foam body of a non-uniform foam thickness.

* * * * *